TELEPHONE CALL FORWARDING METHOD AND APPARATUS
Filed Nov. 29, 1967
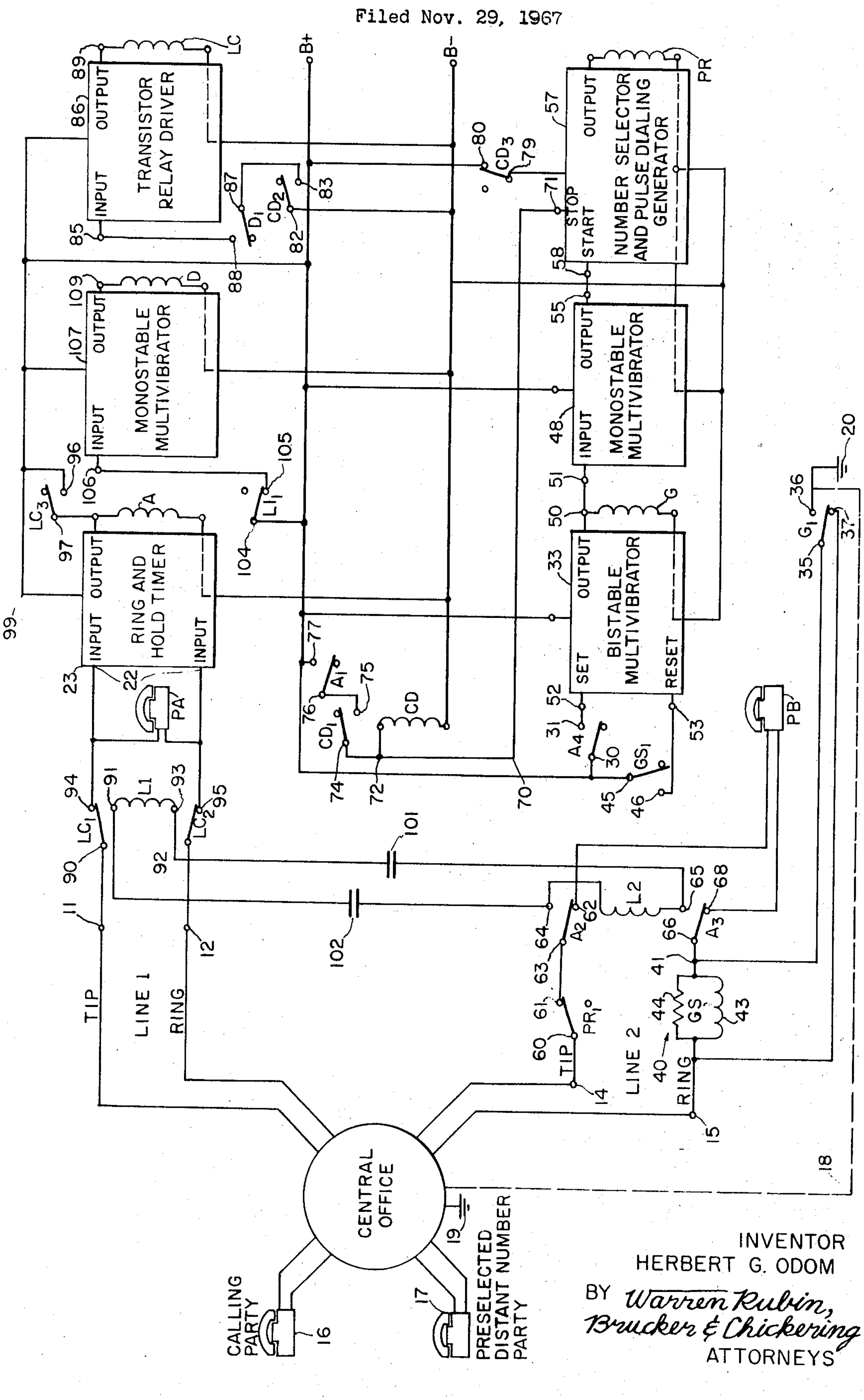
INVENTOR
HERBERT G. ODOM
BY Warren Rubin, Brucker & Chickering
ATTORNEYS United States Patent Office
3,542,964
Patented Nov. 24, 1970

3,542,964
TELEPHONE CALL FORWARDING METHOD AND APPARATUS

Herbert G. Odom, Oakland, Calif., assignor, by mesne assignments, to Ford Industries, Inc., Portland, Oreg., a corporation of Washington Filed Nov. 29, 1967, Ser. No. 686,604
Int. Cl. H04m 3/00
U.S. Cl. 179—18 12 Claims

ABSTRACT OF THE DISCLOSURE

Improvements in circuitry for a telephone system of the type which automatically transfers an incoming call to a pre-selected distant number. Circuitry is shown in cooperation with a pair of service lines from central office, wherein an incoming call from a calling party is detected on one of such lines and in response thereto the remaining line is momentarily shorted to ground and thereby prepared for receiving an outgoing dialing signal. Subsequent to transmission of such dialing signal and coupling of the service lines for the call communication, circuitry means are provided for detecting termination of the call by responding to an open circuit on the incoming call line, which open circuit occurs at central office when the calling party hangs up.

The invention relates to telephone circuitry of the type which automatically transfers an incoming call on a first line to a pre-selected remote number reached over a second line, and more particularly to a method and apparatus for reliably sensing supervisory line signal independent of a central office dial tone.

The present invention is particularly concerned with reliable and discriminatory detection of telephone line signals supplied by a central office switching system. In order for the automatic forwarding of calls to proceed smoothly, it is of primary importance that the forwarding circuitry operate immediately in response to unambiguous central office signals. A system, which in many ways satisfies this criterion, is described in co-pending U.S. Pat. No. 3,409,741 for Telephone Call Diverter Control Circuit. The circuitry described therein improved the reliability of call forwarding apparatus by operating in response to the presence or absence of a central office dial tone, which dial tone is merely an alternating current signal. However, the detection of a dial tone signal has been found to involve a finite delay in the switching operation due to the inherent nature of alternating current signals. Accordingly, a momentary delay is interjected into the switching operation at several points during a call transfer. Now, in many cases, these short periods of delay, which may be for example on the order of several seconds are entirely tolerable and have no substantial adverse effect on the system's efficiency. However, it would nevertheless be advantageous to devise a technique whereby the call forwarding circuitry operates independently of the central office dial tone this eliminating the mentioned delays and enhancing the system's continuity of operation.

Accordingly, it is a broad object of the present invention to provide a call forwarding system including a method and apparatus for reliable and rapid sensing of central office signals, and to do so with a minimum number of components and economically reasonable cost.

It is a more particular object of the present invention to provide method and apparatus for sensing termination of a telephone call independently of the central office dial tone, i.e., open line signal.

It is another important particular object of the present invention to provide a method and apparatus in call forwarding circuitry for determining the readiness of a service line to receive an outgoing dialing signal independently of the central office dial tone or open line signal.

It is a feature and advantage of the present invention that one or more of the above objects are achieved with a minimum number of components, thus obtaining a corresponding increase in efficiency and reliability.

It is a further important advantageous feature of the present invention that the call termination is achieved by sensing abrupt changes in direct current as contrasted with detection of the presence or absence of an alternating current signal such as a dial tone.

Further objects, features and advantages of the present invention are set forth in the following detailed description of a preferred form of the present invention. Additionally, it will be appreciated that the following description is by way of example and is not by itself intended to limit the scope and spirit of the invention as defined by the accompanying claims.

Referring now to the single drawing, a combined schematic and block diagram is shown illustrating the method and apparatus of the present call forwarding device.

In general, a pair of telephone lines, line 1 and line 2, are shown, originating from a central office and connected to input terminals of the invention, terminals 11 and 12, 14 and 15, respectively. In response to an incoming call over line 1 initiated by calling party 16, the method and apparatus of the present invention functions in sequence to (1) detect the incoming call over line 1, (2) activate line 2 for receiving an outgoing dialing signal by momentarily grounding the ring conductor of line 2, (3) signal or pulse dial a pre-selected distant number party 17, over line 2, (4) couple lines 1 and 2 for communication between the calling party 16 and distant number party 17, (5) detect termination of the call by the calling party by responding to an electrical opening of the tip conductor of line 1 and (6) decouple lines 1 and 2 restoring the circuitry to enable a response to a subsequent incoming call.

Before proceeding with further details of the circuitry functions, it is anticipated that the present invention will be used in conjunction with a ground start central office system. Particularly, a two conductor ground start telephone line, for example, line 2, including a tip conductor and a ring conductor as illustrated, is readied for receiving an outgoing dialing signal in response to the appearance at central office of a ground short or partial ground short across the ring conductor of the line. The ground in this case is the classical earth ground. Particularly, a circuit is completed through the ring conductor of line 2, to earth ground at the diverter station end of line 2 and back to a central office earth ground to an electrical source (not shown) connected between the central office earth ground and the ring conductor of line 2. When such a ground short occurs, a small current provided by central office flows in the ring conductor of the line to ground, which current flow is sensed at central office. In response thereto central office switching circuitry connects a source to the tip conductor (the tip conductor is normally open) causing a dial tone to appear across the tip and ring conductors of the line. This closure of the tip conductor to a voltage source also occurs in response to an incoming call on a ground start line. It will be appreciated that the circuit completed through earth ground in essence, forms a third conductor, illustrated in the drawing by doted line 18. Accordingly, the earth ground connections as described here may be replaced by a third wire conductor as a substitute for earth ground 19 and 20.

Also, and importantly, when central office responds to the ground short, simultaneuosly with the closure of the tip conductor of the line a step increase in current flow occurs in the grounded ring circuit. According to the present invention, such step increase in the current provides a supervisory signal for informing the diverter circuitry that line 2 is in condition for receiving a dialing signal or other signal, e.g., tone dialing signal, required for reaching the preselected distant number.

Finally, the ground start system has the characteristic of opening the tip conductor of the line upon termination of the call by the calling party. This additional characteristic is utilized by the invention to provide a supervisory signal indicative of the call completion. That is, when the tip conductor of the line is open, for example, the tip conductor of line 1, current previously flowing in closed circuit loop including the tip and ring conductors is immediately interruptedthereby causing a current change which by appropriate means can be detected.

To allow for a complete and firm understanding of the invention, the circuitry and principle of operation thereof will be described in sequence as the call forwarding system responds to an incoming call.

Detection of incoming call

A calling party, 16, by dialing the number designated for line 1 causes an alternating current ringing signal to appear across system's input terminals 11 and 12 from central office. This ringing signal is applied across an input 22 of a ring and hold timer 23 through normally closed LC relay contacts $LC_1$, 90, 94, and 92, 95. Such ringing signal also is applied to the bell of telephone PA which is connected through the normally closed LC relay contacts across terminals 11 and 12. It is noted that the inclusion of telephones PA and PB is optional, however, they have been included in the preferred form of the invention to allow for the use of a conventional telephone instrument at the forwarding station in the absence of incoming calls or when the call forwarding system has been turned off. Ring and hold timer 23 responds to the incoming ringing signal and energizes an A relay coil connected across the output thereof.

Ring and hold timer 23, functions to convert a periodic alternating signal, viz., the ringing signal, into a continuous DC current sufficient to continuously energize the A relay coil so long as a ringing signal is applied to input 22. A circuit which satisfactorily performs this function is described in the above-mentioned Pat. No. 3,409,741, wherein such circuit is designated as ring and hold timer 36 accordingly a detailed description thereof will not be given here. As an alternative to ring and hold timer 23, a direct current sensing network similar to hereinafter described network 40 may be connected across the tip and ring conductors of line 1 for sensing a current change thereacross caused by closure at central office of the tip conductor to a voltage source indicating the start of an incoming call on line 1.

Activation of line 2

When the A relay coil is energized, normally open $A_4$ relay contacts 30 and 31 close switching bi-stable multivibrator 33 to the set state. Multivibrator 33 is normally in the reset condition. The output of multivibrator 33 is connected across a G relay coil, wherein the G relay coil is energized when multivibrator 33 is in the set condition and de-energized when in the reset state. Accordingly, in response to the closure of $A_4$ relay contacts 30 and 31, applying B+ to the set terminal, the G relay is energized closing normally open $G_1$ relay contacts 35 and 36 and opening normally closed $G_1$ relay contacts 35 and 37. Upon this occurance, the normally shorted ground start network 40 is serially inserted in the ring conductor of line 2 with terminal 41 of network 40 connected to ground 20 through $G_1$ relay contacts 35 and 36. In this circuit condition, current will flow from central office into terminal 15 of the ring side of line 2, through network 40 into ground 20 and back to the central office ground 19.

After an indeterminant interval, a step increase in such current flow will occur indicating that the central office and thus line 2 is ready to receive a dialing signal.

Now, ground start network 40 is comprised of a GS relay coil 43 and a shunt resistor 44 selected to allow the GS relay to respond to the step increase in current without receiving a sufficient current to close its associated contacts in the presence of the initial low current flow. Specifically, the initial current flow in response to the closure of $G_1$ relay contacts 35 and 36 may be on the order of 30 milliamperes while after the step increase in current, as much as 90 milliamperes may flow. Accordingly, the GS relay will not operate until and after the occurrence of such current step increase and thereby functions to detect the readiness of line 2 for receiving an outgoing call.

As the GS relay coil is energized, normally open $GS_1$ relay contacts 45 and 46 close applying B+ to the reset of multivibrator 33 thereby switching it to its reset condition and de-energizing the G relay coil. This operation removes the ground from the ring side of line 2 and shorts out the ground start network 40. It is preferred that the impedance provided by network 40 be removed, i.e., shorted out, before line 2 is utilized to receive an outgoing call as undesirable signal loss would otherwise result.

Bi-stable multivibrator 33, in addition to controlling the G relay, functions to actuate monostable multivibrator 48 by means of a connection between output terminal 50 of multivibrator 33 with input terminal 51 of multivibrator 48.

At this point, the distinction between a bi-stable and a mono-stable multivibrators should be discussed. A bistable multivibrator, as well known in the art, has two stable electrical states or conditions wherein either of such two states may be selected by pulsing one of a pair of separate inputs. For example, in the case of multivibrator 33, such separate inputs correspond to the set and reset inputs 52 and 53 respectively. As contrasted with the bi-stable device, a mono-stable multivibrator, as the name implies, exhibits only one stable state and upon being actuated to the unstable state automatically reverts to its stable condition after an interval determined by design. In the case of mono-stable multivibrator 48, as input terminal 51 thereof is pulsed by the output of multivibrator 33, a step voltage or current change occurs at output 55. Also, as well known in the art, a mono-stable multivibrator may be designed to respond only to a preselected input pulse polarity.

This latter important feature of mono-stable multivibrators is utilized in the instant case to actuate multivibrator 48 only in response to the switching of multivibrator 33 from the set to the reset state and not vice versa. That is, output 55 of multivibrator 48 switches from B− to B+ in response to an input pulse at input terminal 51 going from B+ to B− as occurs when multivibrator 33 switches from the set to reset condition.

Signaling preselected distant number

According to this described operation, number selector and pulse dialing generator 57 is initiated by the appearance of B+ at start terminal 58 in response to the step increase in current produced by the central office and detected by the GS relay. Number selector and pulse dialing generator 57 functions to automatically dial or otherwise signal a pre-selected distant number over line 2.

For this purpose a dialing mechanism as described in the above-mentioned Pat. No. 3,409,741 together with a series of adjustable digit selector switches also described in the same patent application may be employed. As described in Pat. No. 3,409,741, a motorized rotating wiper arm is arranged to sequentially sweep past and make contact with a circular array of dialing pulse contacts.

For example, in a seven-digit telephone number system, seven sets of dialing pulse contacts, having ten contacts each are provided. Each set in this case would be segregated from one another so as to separate each pulse group. To allow for selecting the distant number each set of contacts is provided with adjustable digit selector switches, connected to the dialing pulse contacts such that the number of current pulses provided at the generator output for each set of contacts is controlled by the selection made at each of the seven selector switches.

If desired, pulse dialing generator 57 may be substituted with any of a variety of telephone signaling means such as an audio tone generator for signaling the remote number by a sequence of discrete frequency tones, a device presently used in the art.

In the present illustration, as in the case of the above mentioned patent application, a PR relay coil is connected between a reference voltage (B−) and an output terminal of generator 57 such that upon rotation of the above-mentioned wiper arm, the PR relay coil is sequentially energized according to the pre-selected number. In response thereto, normally closed $PR_1$ relay contacts 60 and 61 are repeatedly opened and closed having the effect of interrupting current flow from the tip side of line 2 through previously closed $A_2$ relay contacts 63 and 64, line 2 terminating coil L2, previously closed $A_3$ relay contacts 65 and 66, closed $G_1$ relay contacts 35 and 37 and back to the ring side of line 2. This operation generates the dialing pulses which are transmitted to the central office over line 2 and eventually signal party 17.

As described in patent application Ser. No. 373,263, when the wiper arm completes a single cycle of rotation thus effectively dialing the pre-selected distant number, the arm makes a momentary connection with an auxiliary contact (contact 134 shown in FIG. 1 thereof) which provides a means to terminate the wiper arm rotation and to initiate a coupling of lines 1 and 2.

This feature of operation is diagramatically illustrated in the present drawing by the connection of line 70 between stop terminal 71 of generator 57 and terminal 72 connected to one side of a CD relay coil. Stop terminal 71 would be connected with the above-mentioned auxiliary contact and presents a momentary positive voltage as the wiper arm completes its cycle and makes contact therewith.

Accordingly, upon completion of the pulse dialing or signaling operation, the CD relay is momentarily energized via a B+ signal from line 70, whereupon normally open $CD_1$ relay contacts 74 and 75 close latching the CD relay coil through previously closed $A_1$ relay contacts 76 and 77. The CD relay upon closure opens normally closed contacts 79 and 80 and thereby removes B+ from generator 57 so as to prevent repeating of its operation after having once pulse dialed line 2.

Coupling lines 1 and 2

At this juncture in the operating scheme, line 2 has received an outgoing pulse dialing signal and now awaits to be connected by central office to the pre-selected distant number party 17. Accordingly, the circuitry shown now operates to couple lines 1 and 2 for communication. To this end, as the CD relay coil is energized upon termination of the pulse dialing, normally opened $CD_2$ relay contacts 82 and 83 close connecting B− to inputs 85 of transistor relay driver 86 through previously closed $D_1$ relay contacts 87 and 88, such that a transistor (not shown) within driver 86 is switched to its conductive state applying current through the LC relay which is connected by output terminal 89 in series with the collector emitter circuit of such transistor.

A transistor relay driver is a circuit well known in the art, utilizing the switching characteristics of a transistor between high and low inpedance states of the collector-emitter path pursuant to a control signal applied to the base of the transistor. Such circuit is also disclosed in Pat. No. 3,409,741. In this instance input 85 would be coupled to the transistor base.

The effect of energizing the LC relay coil is to close normally open $LC_1$ relay contacts 90, 91 and $LC_2$ contacts 92, 93, connecting terminating and relay coil L1 across the tip and ring side of line 1. Additionally, this operation opens normally closed $LC_1$ relay contacts 90, 94 and $LC_2$ contacts 92, 95 disconnecting line 1 from telephone PA and input 22 of ring and hold timer 23. It is noted that while the A relay coil is no longer energized by ring and hold timer 23 at this point, normally open $LC_3$ relay contacts 96 and 97 close maintaining the A relay in an energized condition through B+ supplied by bus line 99.

Upon energization of the LC relay coil, lines 1 and 2 are coupled by means of capacitors 101 and 102 connecting corresponding ends of the L1 and L2 coils which are in turn connected across lines 1 and 2 respectively. Thus, when the pre-selected distant number party 17 answers his phone, communication proceeds through central office to line 2 where audio-frequency signals are developed across the L2 coil. Likewise, audio-frequency signals presented on line 1 from calling party 16 appear across terminating and relay coil L1. Capacitors 101 and 102 thereby effectively couple such audio signals, i.e., alternating low frequency current signals, between each of the L1 and L2 coils. Of course, any direct current traversing either coils L1 or L2 through lines 1 or 2 is blocked by capacitors 101 and 102 from co-mingling with direct current in the remaining line or coil. Lines 1 and 2 remain coupled in this manner until the calling party terminates the call by hanging up.

Detecting termination of the call

We come now to another important aspect of this invention, particularly relating to the method and means for detecting the call termination and restoring the circuit for forwarding a subsequent call. In essence, the invention provides for detecting the opening of the tip side of either line 1 or 2 or both wherein such opening coincides with the call termination. In the present illustration, the circuit drawing shows means for detecting the call termination by calling party 16 via the opening of the tip side of line 1. However, this basic concept may be employed in conjunction with line 2 or both lines 1 and 2.

Pursuant to the instant case, terminating and relay coil L1 is provided with and actuates a pair of normally closed L1 contacts 104 and 105 connecting B+ with input 106 of a mono-stable multivibrator 107. By this arrangement, multivibrator 107 is operated in response to a particular change in current flow through the L1 terminating and relay coil.

Mono-stable multivibrator 107 is of the type discussed in conjunction with multivibrator 48, and operates to switch between a stable state and an unstable state, remaining in the latter condition for a designed interval. Particular to multivibrator 107, it is designed to respond only to a positive going input pulse, e.g., the instantaneous application of B+ upon closure of $L1_2$ contacts 104 and 105 to input 106. Furthermore, multivibrator 107 is designed to supply a normally flowing unidirectional current through a D relay coil connected to output 109 during the stable state of the multivibrator. Thus, it is noted that the D relay remains normally energized and is de-energized only for a given interval in response to actuation of multivbirator 107 into its unstable state.

Decoupling lines 1 and 2

Now, in cooperation with the call forwarding circuitry, multivibrator 107 together with $L1_1$ relay contacts 105 and 104 operate in response to termination of the call on line 1, by momentarily de-energizing D relay, opening $D_1$ relay contacts 87 and 88 and thereby de-energizing the LC relay coil through transistor relay driver 86.

Now summarizing the effect of this above operation, as the LC relay is energized connecting terminating and relay coil L1 across line 1, a unidirectional current flow, produced by central office, flows from line 1 through coil L1. This causes L1 relay contacts 104 and 105 to open removing B+ from input 106 of multivibrator 107. However, as noted above, multivibrator 107 responds only to a positive going input pulse and thus is not actuated by this operation. Now, when the call is completed and calling party 16 hangs up, the tip side of line 1 is opened at central office terminating current flow through L1 and allowing L1 contacts 104 and 105 to close, thus applying B+ to input 106. In response thereto, multivibrator 107 momentarily de-energizes the D relay coil opening $D_1$ relay contacts 87 and 88, thus removing B− from input 85 of driver 86 and thereby de-energizing the LC relay. It is important to note, that multivibrator 107 cannot respond to the initial opening of L1 relay contacts 104 and 105, as this would de-energize the D relay during forwarding of the call, before the calling party has terminated the call.

Continuing, upon de-energization of the LC relay, LC relay contacts, $LC_1$ 90–91 and $LC_2$ 92–93 open removing L1 from line 1. $LC_3$ relay contacts 96 and 97 open de-energizing the A relay coil. $A_1$ relay contacts 76 and 77 accordingly open thus unlocking the CD relay coil and the circuit is restored to its quiescent or standby condition ready to receive another incoming call over line 1.

In summary, the present invention provides a call forwarding system for use with a pair of ground start telephone lines wherein the principal features relate to preparing one of the lines for receiving an outgoing calling signal, e.g., pulse dialing by momentarily grounding the ring side thereof in response to the detection of an incoming call on the remaining line and immediately decoupling the lines, after a foregoing communication, in response to the detection of an open circuit in the tip side of either or both of the telephone lines indicating termination of the call.

I claim:

1. In an automatic call transferring system for use with first and second telephone lines associated with a central office, at least said second line being of the ground start type and having tip and ring conductors and said system including an incoming call detector coupled to said first line, a signal generator coupled to said second line, a switching means coupling said lines for communication subsequent to operation of said generator, a call termination detector coupled to at least one of said lines operating said switching means to decouple said lines in response to termination of a call, the combination with said incoming call detector and said generator of an additional switching means connecting said ring conductor of said second line to ground in response to detection of an incoming call on said first line; and detector means coupled to said last mentioned ring conductor responsive to a supervisory signal appearing thereon to initiate said generator for signaling a pre-selected distant number over said second line.

2. In an automatic call transferring system for use with a pair of ground start telephone lines associated with a central office, each of said lines including tip and ring conductor; the combination comprising:

- a first detector coupled to a first of said lines sensing an incoming call signal;
- a first switching means connecting said ring conductor of a second of said lines to ground in response to said first detector;
- a second detector coupled to said ring conductor of said second line responsive to a change in current flow therealong;
- a generator coupled to said second line and being operated by said second detector for signaling a pre-selected distant number over said second line;

- a second switching means coupling said lines for communication subsequent to operation of said generator; and
- a third detector coupled to at least one of said lines responsive to termination of a call and operating said second switching means for decoupling said lines.

3. The system of claim 2 wherein said first switching means includes contacts in series with said ring conductor and said ground and electrical means actuating said contacts, said contacts being closed by said electrical means in response to said first detector; and wherein said second detector includes a relay coil serially connected in said ring conductor and contacts operated by said relay coil; said last mentioned contacts connected with said electrical means for operating and opening said first mentioned contacts in response to said change in current.

4. The system of claim 2, including a third switching means for serially connecting said second detector in said ring conductor; said first and third switching means concurrently operated by said first detector; said first and third switching means further concurrently operated by said second detector for disconnecting said second detector and said ground from said ring conductor in response to said change in current.

5. The system of claim 2 wherein said third detector comprises a relay coil serially connected with one of said lines and being responsive to an interruption of current flow therein.

6. The system of claim 2, including a third switching means, a bistable multivibrator having a pair of inputs; and fourth and fifth switching means; said third switching means disposed for connecting said second detector in series with said ring conductor; said first and third switching means coupled and operated concurrently by said multivibrator output; said fourth and fifth switching means connected to separate said multivibrator inputs for switching said multivibrator between separate distinct states; said fourth switching means operated by said first detector and said fifth switching means operated by said second detector whereby said second detector and ground are connected to said ring conductor in response to said incoming call signal and disconnected from said ring conductor in response to said change in current flow.

7. The system of claim 6 further including a monostable multivibrator having an input connected to said bistable multivibrator, and an output connected to said generator for operating said generator upon actuation of said fifth switching means.

8. The system of claim 2 wherein said second detector includes a relay coil for serial connection with said ring conductor.

9. The system of claim 8 further including a shunt impedance connected across said relay coil for providing current selective operation of said relay coil in response to said change in current flow.

10. The system of claim 2 including a pair of line terminating coils; an alternating current coupling means; said second switching means connecting a first of said coils across the conductors of said first line and connecting a second of said coils across the conductors of said second line, and said current coupling means being connected across respective terminal ends of said coils.

11. The system as defined in claim 10 wherein said third detector comprises a pair of relay contacts operated by said first terminating coil, said contacts being coupled with said second switching means for decoupling said line in response to de-energization of said first terminating coil.

12. In an automatic call transferring system for use with a pair of ground start telephone lines associated with a central office, each of the said lines including tip and ring conductors; the combination comprising:

- a detector coupled to a first of said lines sensing an incoming call signal thereon;

a generator coupled to a second of said lines and operated in response to said first detector for signaling a preselected distant number over said second line;

a switching means coupling said lines for communication subsequent to operation of said generator;

a relay having a coil and contacts operated by said coil, said coil disposed for connection across the tip and ring conductors of one of said lines; and a monostable multivibrator having an input and output, said contacts being connected with said multivibrator input for switching said multivibrator from a stable state to an unstable state in response to deenergization of said coil, said multivibrator output being connected to and for operating said switching means to decouple said lines in response to said multivibrator assuming its unstable state.

References Cited

UNITED STATES PATENTS

| | | | |
|---|---|---|---|
| 2,095,712 | 10/1937 | Peterson | 179—18 |
| 2,806,902 | 9/1957 | Gutierrez | 179—18 |

KATHLEEN H. CLAFFY, Primary Examiner

D. L. STEWART, Assistant Examiner

Dedication 3,542,964.—*Herbert G. Odom*, Oakland, Calif. TELEPHONE CALL FORWARDING METHOD AND APPARATUS. Patent dated Nov. 24, 1970. Dedication filed Jan. 3, 1972, by the assignee, *Ford Industries, Inc.*

Hereby dedicates to the Public the entire remaining portion of the term of said patent.

[*Official Gazette August 1, 1972.*]